US008194404B2

(12) United States Patent
Xie et al.

(10) Patent No.: US 8,194,404 B2
(45) Date of Patent: Jun. 5, 2012

(54) HARD DISK DRIVE FRAME

(75) Inventors: Fu-Qin Xie, Taipei Hsien (TW); Hung-Ming Chang, Taipei Hsien (TW)

(73) Assignee: Wistron Corp., New Taipei (TW)

( * ) Notice: Subject to any disclaimer, the term of this patent is extended or adjusted under 35 U.S.C. 154(b) by 161 days.

(21) Appl. No.: 12/843,856

(22) Filed: Jul. 26, 2010

(65) Prior Publication Data

US 2011/0267763 A1    Nov. 3, 2011

(30) Foreign Application Priority Data

Apr. 29, 2010    (TW) .............................. 99113732 A

(51) Int. Cl.
*G06F 1/16*    (2006.01)
*H05K 5/00*    (2006.01)
*H05K 7/00*    (2006.01)

(52) U.S. Cl. .................... 361/679.37; 361/725

(58) Field of Classification Search ............. 361/679.02, 361/679.31, 679.33–679.39, 679.58, 679.6, 361/724–727; 29/603.04, 428, 453, 469, 29/525, 603.01; 248/682, 694

See application file for complete search history.

(56) References Cited

U.S. PATENT DOCUMENTS

| | | | | |
|---|---|---|---|---|
| 5,680,294 A * | 10/1997 | Stora et al. | ..................... | 361/695 |
| 5,967,633 A * | 10/1999 | Jung | ........................... | 312/223.2 |
| 6,234,592 B1 * | 5/2001 | Liu et al. | ..................... | 312/223.2 |
| 6,257,682 B1 * | 7/2001 | Liu et al. | ..................... | 312/223.2 |
| 6,382,744 B1 * | 5/2002 | Xiao | .......................... | 312/223.2 |
| 6,628,512 B2 * | 9/2003 | Searby et al. | ............ | 361/679.58 |
| 6,644,762 B1 * | 11/2003 | Chen | .......................... | 312/223.2 |
| 6,918,174 B2 * | 7/2005 | Kim et al. | .................. | 29/603.04 |
| 7,253,359 B2 * | 8/2007 | Chen et al. | ....................... | 174/50 |
| 7,525,796 B2 * | 4/2009 | Chih et al. | ............... | 361/679.33 |
| 7,843,687 B2 * | 11/2010 | Mariano et al. | .......... | 361/679.58 |
| 8,054,623 B2 * | 11/2011 | Mariano et al. | .......... | 361/679.58 |
| 2001/0030429 A1 * | 10/2001 | Yen et al. | ....................... | 292/207 |
| 2004/0074082 A1 * | 4/2004 | Kim et al. | .................. | 29/603.03 |
| 2007/0217137 A1 * | 9/2007 | Chen et al. | ..................... | 361/683 |
| 2009/0040744 A1 * | 2/2009 | Tsai et al. | ...................... | 361/825 |

\* cited by examiner

*Primary Examiner* — Jinhee Lee
*Assistant Examiner* — Adrian S Wilson
(74) *Attorney, Agent, or Firm* — CKC & Partners Co., Ltd.

(57) ABSTRACT

An HDD frame is used to fix several HDDs and several HDD cables. The HDD frame includes an HDD cage, a latch and an HDD cable bracket. The HDD cage includes three cage boards. Two of the cage boards are disposed at two ends of the other cage board. The latch includes a protrusion. The HDD cable bracket includes a baseboard and a sideboard, which are perpendicular to each other. The baseboard includes a first long edge and a second long edge. The sideboard is disposed at the second long edge. One end of the latch is fixed on the end of the sideboard to make the protrusion protrude through the sideboard hole of the sideboard. After the long edges of the HDD cable bracket are inserted into tracks on the HDD cage, the protrusion protrudes into the cage hole of the HDD cage.

10 Claims, 3 Drawing Sheets

HARD DISK DRIVE FRAME

RELATED APPLICATIONS

This application claims priority to Taiwan Application Serial Number 99113732, filed Apr. 29, 2010, which is herein incorporated by reference.

BACKGROUND

1. Technical Field

The present invention relates to a Hard Disk Drive (HDD) frame. More particularly, the present invention relates to an HDD frame, which can be combined or taken apart without any tools.

2. Description of Related Art

Rapid technological advancement means computer must be able to have better processing and storage abilities. Since storage devices, such as HDDs, are cheap, it is common to install several HDDs in a computer to provide better storage capability. Hence, HDD frames, which are used to fix HDDs, are deposited in most computer cases.

In addition, HDD frames may include a HDD cable bracket to fix HDD cables, which are connected to the HDDs. In the prior art, HDD cable brackets are fixed on HDD frames with screws. Hence, tools, such as screwdrivers or other tools, are needed to fix or remove the HDD cable brackets. However, it is inconvenient to fix or remove the HDD cable brackets without any tools.

Above all, it is an important issue to design a HDD frame, which can be combined or taken without any tools.

SUMMARY

An HDD frame, which can be combined or taken apart without any tools, is provided. The HDD frame is used to fix several HDDs and several HDD cables. The HDD frame includes an HDD cage, a latch and an HDD cable bracket. The HDD cage is used to fix the HDDs. The HDD cage includes a first cage board, a second cage board and a third cage board. The second cage board and the third cage board are disposed at two ends of the first cage board. The second cage board includes a first track. The third cage board includes a second track and a cage hole. The latch includes a protrusion. The HDD cable bracket is used to fix the HDD cables. The HDD cable bracket includes a baseboard and a sideboard. The baseboard is perpendicular to the sideboard. The baseboard includes a first long edge and a second long edge. The sideboard is disposed at the second long edge. The sideboard includes a sideboard hole. One end of the latch is fixed on the end of the sideboard to make the protrusion protrude through the sideboard hole. After the long edges of the HDD cable bracket are inserted into the tracks on the HDD cage, the protrusion protrudes into the cage hole.

According to one embodiment of this invention, the baseboard may further include two short edges, and the first cage board may include a seam. One of the short edges is inserted into the seam when the HDD cable bracket is inserted into the HDD cage. In addition, the baseboard may further include a baseboard stopper disposed at the short edge to be inserted into the seam. The baseboard may further include a baseboard handle, disposed at the short edge not to be inserted into the seam.

According to another embodiment of this invention, the latch may further include a latch handle. The latch handle and the protrusion are disposed at the opposite surfaces of the latch.

According to another embodiment of this invention, the protrusion may be smaller than the sideboard hole. In addition, the protrusion may be smaller than the cage hole.

According to another embodiment of this invention, the latch and the end of the sideboard may include several rivet holes or pop rivet holes to fix one end of the latch on the end of the sideboard.

According to another embodiment of this invention, the protrusion may include a latch stopper perpendicular to the latch.

Above all, the HDD cable bracket can be fixed on the HDD cage by engaging the protrusion of the HDD cable bracket with the hole on the HDD cage. In addition, when the protrusion is pulled out of the hole on the HDD cage, the HDD cable bracket can be removed from the HDD cage. Therefore, the HDD cable bracket and the HDD cage of the HDD frame can be combined or taken apart without any tools.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
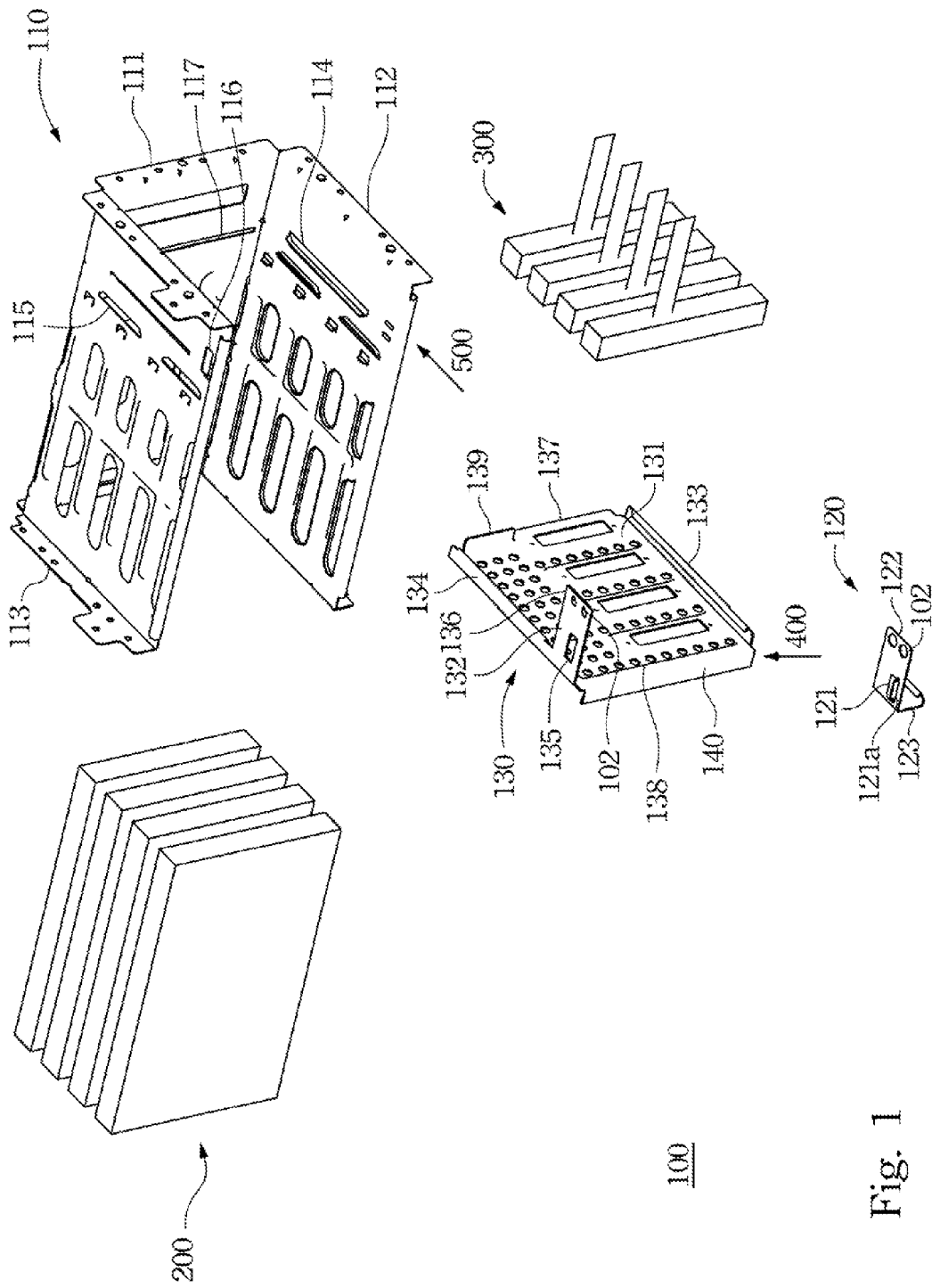
FIG. 1 illustrates an exploded view of an HDD FRAME 100 according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

FIG. 1 illustrates an exploded view of an HDD FRAME 100 according to one embodiment of this invention. The HDD frame 100 is used to fix several HDDs 200 and several HDD cables 300 connected to the HDDs 200. The HDD frame 100 includes an HDD cage 110, a latch 120 and an HDD cable bracket 130. The HDD cage 110 is used to fix the HDDs 200. The HDD cage 110 includes a first cage board 111, a second cage board 112 and a third cage board 113. The second cage board 112 and the third cage board 113 are disposed at two ends of the first cage board 111 respectively. The second cage board 112 and the third cage board 113 respectively include a first track 114 and a second track 115. The third cage board 113 further comprises a cage hole 116.

The latch 120 is made of at least one flexible material and includes a protrusion 121. The HDD cable bracket 130 is used to fix the HDD cables 300. The HDD cable bracket 130 includes a baseboard 131 and a sideboard 132, which are perpendicular to each other. The baseboard 131 includes a first long edge 133 and a second long edge 134. The sideboard 132 is disposed at the second long edge 134 and includes a sideboard hole 135.

Figure 2:
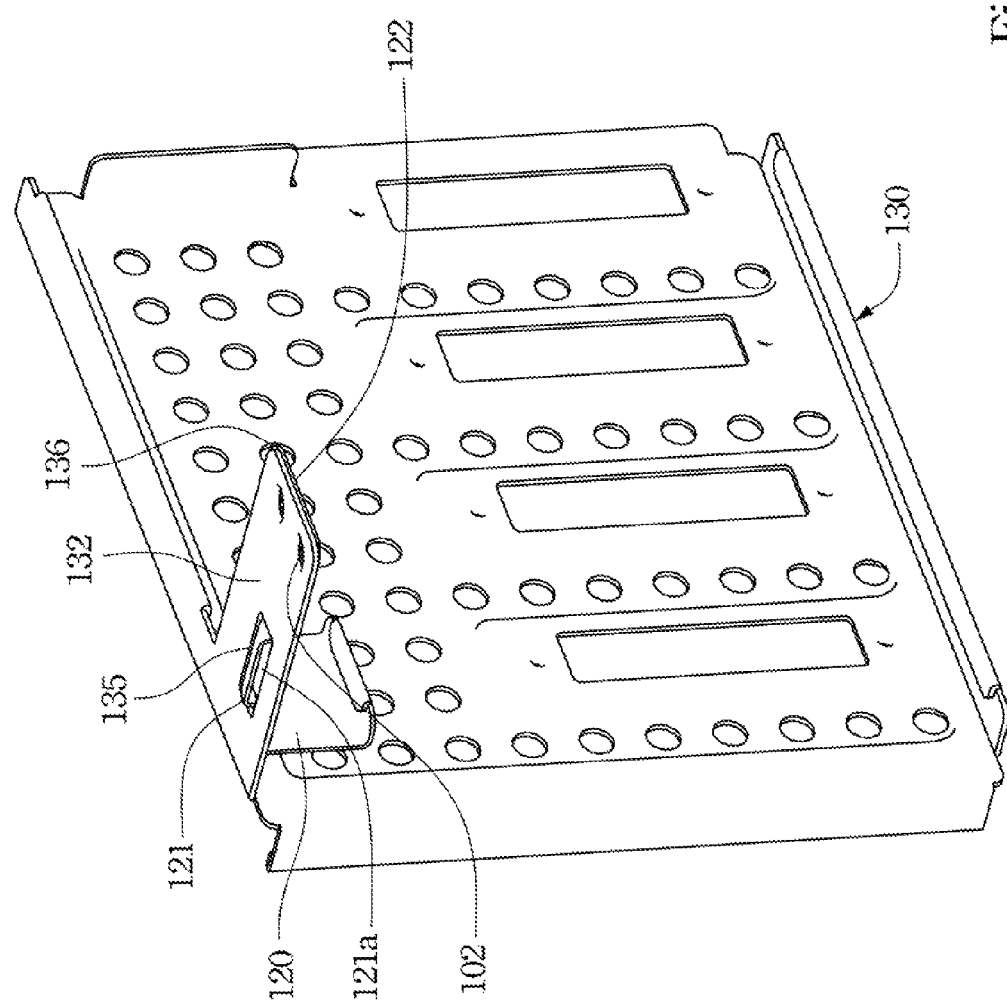
FIG. 2 illustrates a diagram that the latch 120 is fixed on the HDD cable bracket 130.

The latch 120 is fixed on the sideboard 132 of the HDD cable bracket 130. FIG. 2 illustrates a diagram that the latch 120 is fixed on the HDD cable bracket 130. Refer to both FIG. 1 and FIG. 2. One end 122 of the latch 120 is moved along the direction of the arrow 400 to be fixed on the end 136 of the sideboard 132. Hence, the protrusion 121 protrudes through the sideboard hole 135. The protrusion 121 is smaller than the sideboard hole 135, such that the protrusion 121 can protrude through the sideboard hole 135 after the latch 120 is fixed. The latch 120 and the end 136 of the sideboard 132 may include several rivet holes 102 to fix one end 122 of the latch 120 on the end 136 of the sideboard 132. In another embodiment of this invention, the latch 120 and the end 136 of the sideboard 132 may include several pop rivet holes to fix one end 122 of the latch 120 on the end 136 of the sideboard 132. In other embodiments, one end 122 of the latch 120 can be fixed on the end 136 of the sideboard 132 utilizing other fixing methods, which should not be limited in this invention.

After the latch 120 is fixed on the sideboard 132 of the HDD cable bracket 130, the HDD cable bracket 130 can be inserted into the HDD cage 110 along the direction of the arrow 500. The first long edge 133 and the second long edge 134 of the HDD cable bracket 130 are inserted into the HDD cage 110 through the first track 114 and second track 115 respectively. After the HDD cable bracket 130 is inserted into the HDD cage 110, the protrusion 121 protrudes into the cage hole 116 to be engaged with the cage hole 116. The protrusion 121 may be smaller than the cage hole 116, such that the protrusion 121 can protrude into the cage hole 116 after the HDD cable bracket 130 is inserted into the HDD cage 110. Besides, the protrusion 121 may include a latch stopper 121a perpendicular to the latch 120. Therefore, the protrusion 121 can be engaged with the cage hole 116 through the latch stopper 121a after the HDD cable bracket 130 is inserted into the HDD cage 110.

The baseboard 131 includes two short edges 137 and 138, and the first cage board 111 includes a seam 117. Therefore, when the HDD cable bracket 130 is inserted into the HDD cage 110, the short edge 137 of the baseboard can be inserted into the seam 117. In addition, the baseboard 139 may further include a baseboard stopper 139 disposed at the short edge 137 to be inserted into the seam 117. Therefore, after the HDD cable bracket 130 is inserted into the HDD cage 110, the HDD cable bracket 130 can be fixed on the first track 114 and the second track 115 without slide by engagement between the protrusion 121 and the cage hole 116 and stopping of the baseboard stopper 139. In addition, the HDD cable bracket 130 can be stopped by the baseboard stopper 139, such that the protrusion 121 can be positioned for engagement between the protrusion 121 and the cage hole 116.

Figure 3:
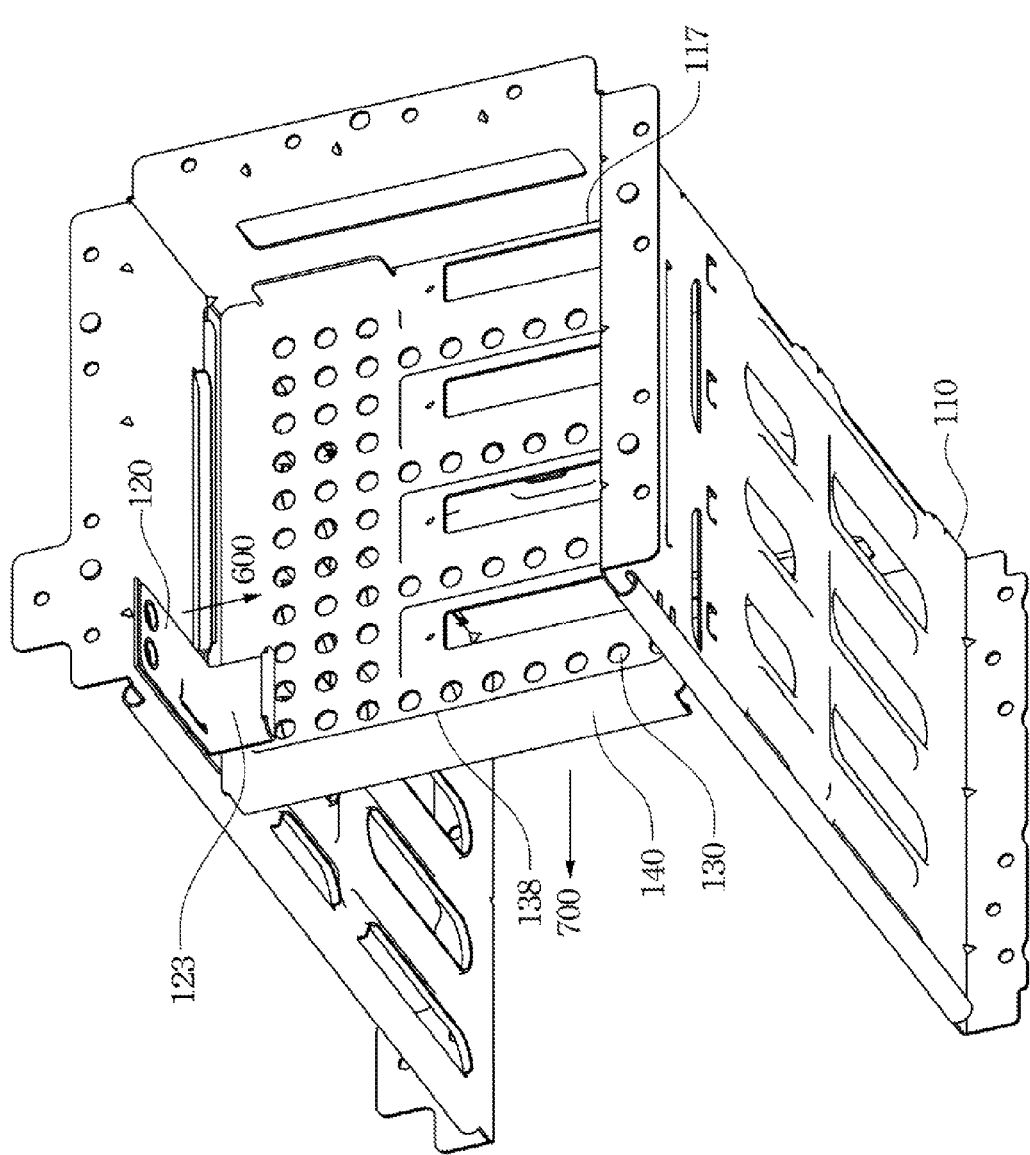
FIG. 3 illustrates diagram of the HDD frame 100 after the HDD cable bracket 130 is inserted into the HDD cage 110.

FIG. 3 illustrates diagram of the HDD frame 100 after the HDD cable bracket 130 is inserted into the HDD cage 110. Then, after the latch 120 is pulled out, the HDD cable bracket 130 can be pulled out of the HDD cage 110. Refer to both FIG. 1 and FIG. 3. The latch 120 may further include a latch handle 123. The latch handle 123 and the protrusion 121 are disposed at the opposite surfaces of the latch 120. Therefore, since the latch 120 is made of at least one flexible material, the latch handle 123 can be pulled along the direction of the arrow 600 to pull the protrusion 121 of the latch 120 out of the cage hole 116, such that the protrusion 121 is not engaged with the cage hole 116. In addition, the baseboard 140 may further include a baseboard handle 140, disposed at the short edge 138 not to be inserted into the seam 117. Hence, after the protrusion 121 is not engaged with the cage hole 116, the HDD cable bracket 130 can be pulled out of the HDD cage 110 by pulling the baseboard handle 140 along the direction of the arrow 700.

Above all, the HDD cable bracket can be fixed on the HDD cage by engaging the protrusion of the HDD cable bracket with the hole on the HDD cage. In addition, when the protrusion is pulled out of the hole on the HDD cage, the HDD cable bracket can be removed from the HDD cage. Therefore, the HDD cable bracket and the HDD cage of the HDD frame can be combined or taken apart without any tools.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A hard disk device (HDD) frame for fixing a plurality of HDDs and a plurality of HDD cables, comprising:
   an HDD cage fixing the HDDs, wherein the HDD cage comprises:
   a first cage board;
   a second cage board, comprising a first track; and
   a third cage board, comprising a second track and a cage hole,
   wherein the second cage board and the third cage board are disposed at two ends of the first cage board;
   a latch comprising a protrusion; and
   an HDD cable bracket fixing the HDD cables, wherein the HDD cable bracket comprises a baseboard and a sideboard, the baseboard is perpendicular to the sideboard, the baseboard comprises a first long edge and a second long edge, the sideboard is disposed at the second long edge, the sideboard comprises a sideboard hole, one end of the latch is fixed on the end of the sideboard to make the protrusion protrude through the sideboard hole,
   wherein the protrusion protrudes into the cage hole after the long edges of the HDD cable bracket are inserted into the tracks on the HDD cage.

2. The HDD frame of claim 1, wherein the baseboard further comprises two short edges, the first cage board comprises a seam, one of the short edges is inserted into the seam when the HDD cable bracket is inserted into the HDD cage.

3. The HDD frame of claim 2, wherein the baseboard further comprises a baseboard stopper disposed at the short edge to be inserted into the seam.

4. The HDD frame of claim 2, wherein the baseboard further comprises a baseboard handle, and the baseboard handle is disposed at the short edge not to be inserted into the seam.

5. The HDD frame of claim 1, wherein the latch further comprises a latch handle, and the latch handle and the protrusion are disposed at the opposite surfaces of the latch.

6. The HDD frame of claim 1, wherein the protrusion is smaller than the sideboard hole.

7. The HDD frame of claim 1, wherein the protrusion is smaller than the cage hole.

8. The HDD frame of claim 1, wherein the latch and the end of the sideboard comprise a plurality of rivet holes to fix one end of the latch on the end of the sideboard.

9. The HDD frame of claim 1, wherein the latch and the end of the sideboard comprise a plurality of pop rivet holes to fix one end of the latch on the end of the sideboard.

10. The HDD frame of claim 1, wherein the protrusion comprises a latch stopper perpendicular to the latch.

* * * * *